(12) United States Patent
Kaler

(10) Patent No.: US 8,863,486 B2
(45) Date of Patent: Oct. 21, 2014

(54) CORN STALK GUIDE SYSTEM

(76) Inventor: Joel Kaler, Ligerwood, ND (US)

(*) Notice: Subject to any disclaimer, the term of this patent is extended or adjusted under 35 U.S.C. 154(b) by 0 days.

(21) Appl. No.: 13/439,119

(22) Filed: Apr. 4, 2012

(65) Prior Publication Data
US 2013/0263564 A1 Oct. 10, 2013

(51) Int. Cl.
A01D 45/02 (2006.01)

(52) U.S. Cl.
USPC .............................................. 56/53

(58) Field of Classification Search
USPC .......................................... 56/53, 94, 98, 119
See application file for complete search history.

(56) References Cited

U.S. PATENT DOCUMENTS

| | | | | |
|---|---|---|---|---|
| 1,504,768 A * | 8/1924 | Laminack | .................... | 56/119 |
| 2,728,184 A * | 12/1955 | Fergason | .................... | 56/119 |
| 2,966,024 A * | 12/1960 | Pool et al. | .................... | 56/119 |
| 3,765,157 A * | 10/1973 | Hyman et al. | .................... | 56/119 |
| 4,204,385 A | 5/1980 | Taylor | | |
| 4,207,726 A | 6/1980 | Lippl | | |
| 4,255,920 A * | 3/1981 | Janzen | .................... | 56/126 |
| 4,377,062 A | 3/1983 | Slattery | | |
| 4,493,181 A | 1/1985 | Glendenning | | |
| 4,538,404 A * | 9/1985 | Heimark et al. | .................... | 56/314 |
| 5,105,610 A | 4/1992 | Britten | | |
| 5,761,893 A | 6/1998 | Lofquist | | |
| 5,875,623 A * | 3/1999 | Wagstaff | .................... | 56/95 |
| 5,910,092 A * | 6/1999 | Bennett | .................... | 56/119 |
| 5,911,673 A | 6/1999 | Johnson | | |
| 6,032,445 A * | 3/2000 | Heintzman | .................... | 56/119 |
| 6,044,636 A | 4/2000 | Minnaert | | |
| 6,237,312 B1 | 5/2001 | Becker | | |
| 6,625,969 B2 | 9/2003 | Glazik | | |
| 7,121,070 B2 * | 10/2006 | Krone et al. | .................... | 56/62 |
| 7,874,134 B1 * | 1/2011 | Hoffman | .................... | 56/119 |
| 8,104,254 B2 * | 1/2012 | Luetke-Harmann et al. | ... | 56/119 |
| 2010/0139229 A1 * | 6/2010 | Teetaert et al. | .................... | 56/119 |

OTHER PUBLICATIONS

PCT Notification & PCT Search Report; Received on Jul. 1, 2013.

* cited by examiner

Primary Examiner — Thomas B Will
Assistant Examiner — Mai Nguyen
(74) Attorney, Agent, or Firm — Jason L. Gilbert

(57) ABSTRACT

A corn stalk guide system for reducing or eliminating the loss of corn stalks as they are guided into the grab rolls of a corn header. The corn stalk guide system generally includes a pair of guide members which may be positioned on opposing teeth of a corn header assembly to guide corn stalks into the assembly without being expelled by exposed sprockets. Each guide member is a tapered, plastic structure having a plurality of apertures extending therethrough. The first guide member will be secured to a first tooth via one or more fasteners extending through the one or more apertures and the second guide member will be secured to a second tooth similarly with fastener(s) and aperture(s). Each guide member will cover a sprocket which normally would extend out from the tooth, thus guiding corn stalks and preventing loss of corn stalks.

8 Claims, 6 Drawing Sheets

CORN STALK GUIDE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a corn stalk guide attachment for corn headers and more specifically it relates to a corn stalk guide system for reducing or eliminating the loss of corn stalks as they are guided into the grab rolls of a corn header.

2. Description of the Related Art

Any discussion of the related art throughout the specification should in no way be considered as an admission that such related art is widely known or forms part of common general knowledge in the field.

Corn headers have been used for many years in harvesting corn. Corn is gathered by use of a corn header attachment for a combine or other vehicle. As the corn header traverses the crop, corn stalks will enter the corn header teeth and be guided to gathering chains and then to grab rollers, which collect and transfer the corn stalks to a storage area.

Often, in existing corn header designs, the sprocket which transfers force to the gathering chains will abut out from the teeth of the corn header. When a corn stalk contacts the exposed sprocket and chain, the stalk can shake so hard that it can lose the corn cob. The corn can then fall forward and out of the corn header. This problem is made worse when the combine follows curved rows of crop. The stalks can hit the exposed sprocket and fall forward out of the corn header.

Because of the inherent problems with the related art, there is a need for a new and improved corn stalk guide system for reducing or eliminating the loss of corn stalks as they are guided into the grab rolls of a corn header.

BRIEF SUMMARY OF THE INVENTION

The invention generally relates to a corn stalk guide system which includes a pair of guide members which may be positioned on opposing teeth of a corn header assembly to guide corn stalks into the assembly without being expelled by exposed sprockets. Each guide member is comprised of a tapered, plastic structure having a plurality of apertures extending therethrough. The first guide member will be secured to a first tooth via one or more fasteners extending through the one or more apertures and the second guide member will be secured to a second tooth similarly with fastener(s) and aperture(s). Each guide member will cover a sprocket which normally would extend out from the tooth, thus guiding corn stalks and preventing loss of corn stalks.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
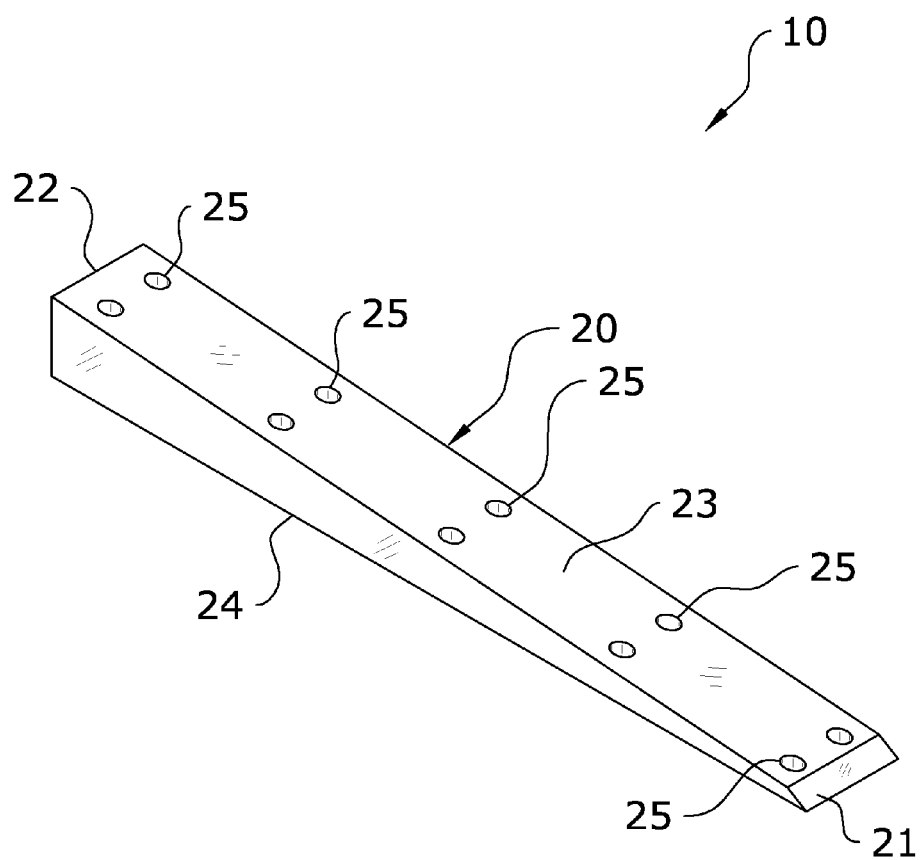
FIG. 1 is a frontal upper perspective view of a first guide member of the present invention.
Figure 2:
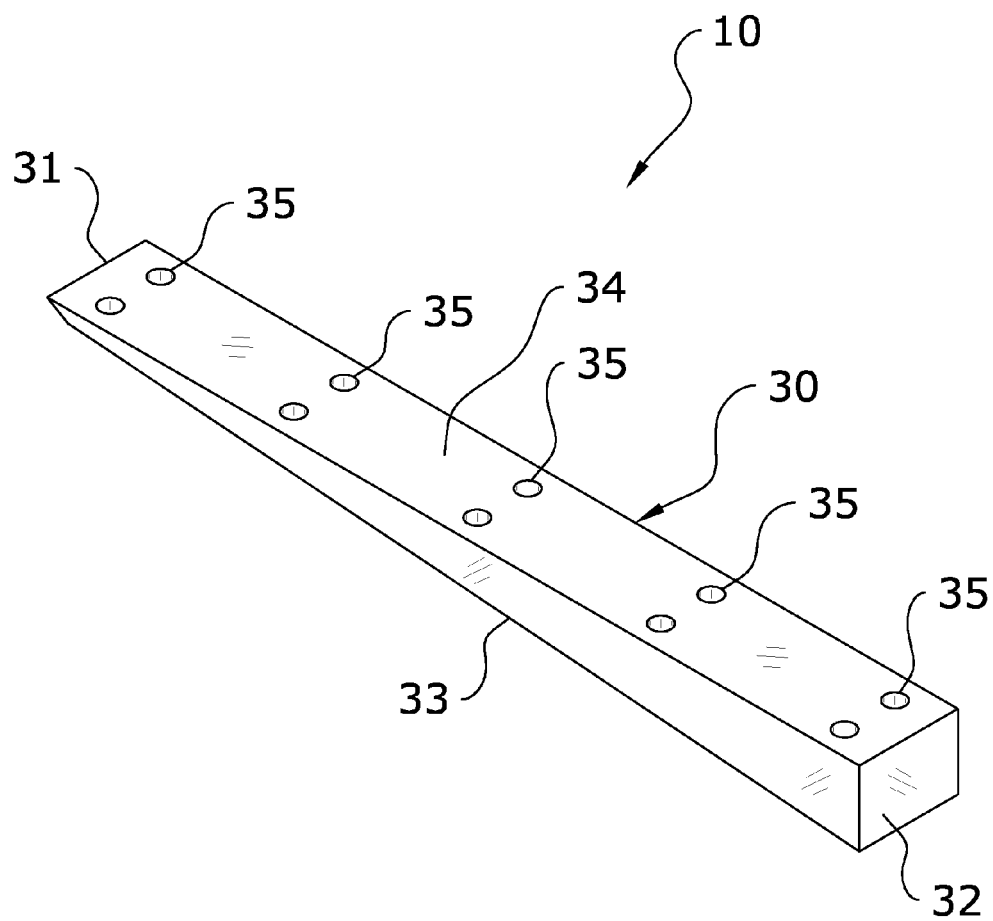
FIG. 2 is a rear upper perspective view of a second guide member of the present invention.
Figure 3:
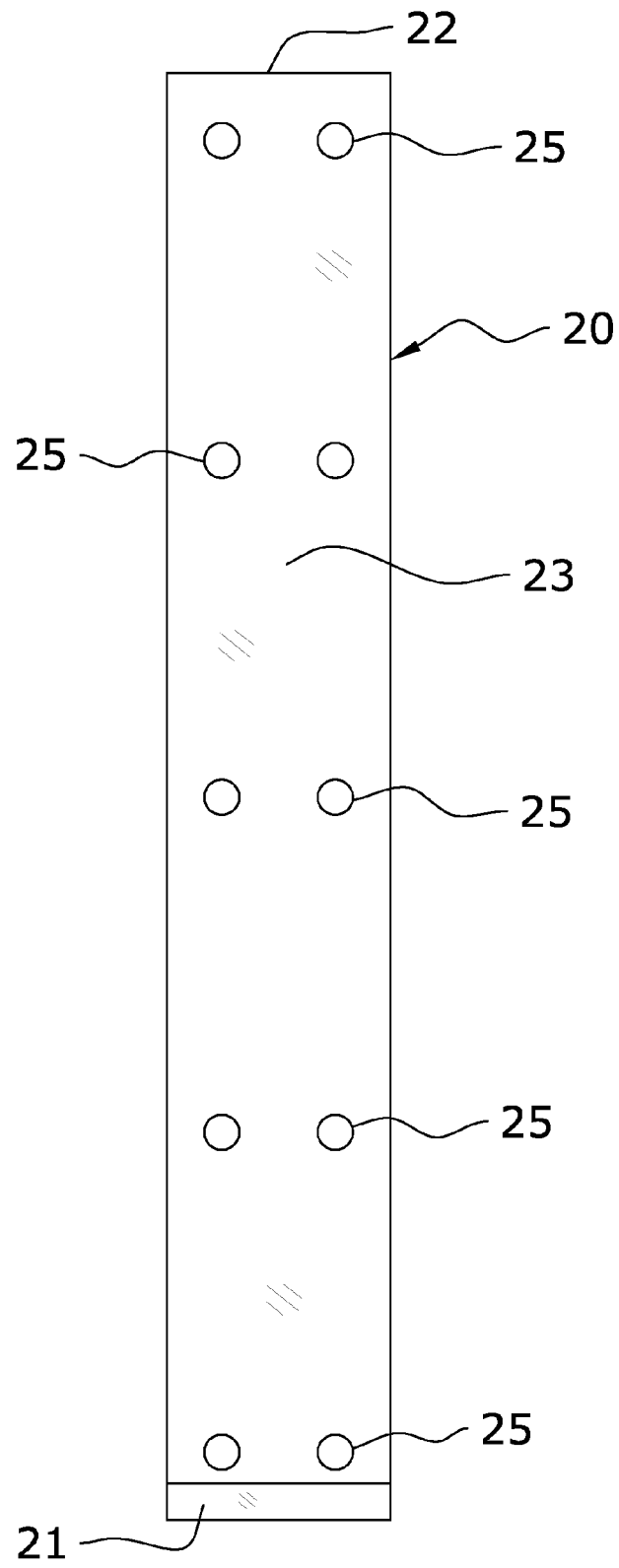
FIG. 3 is a top view of a guide member of the present invention.
Figure 4:
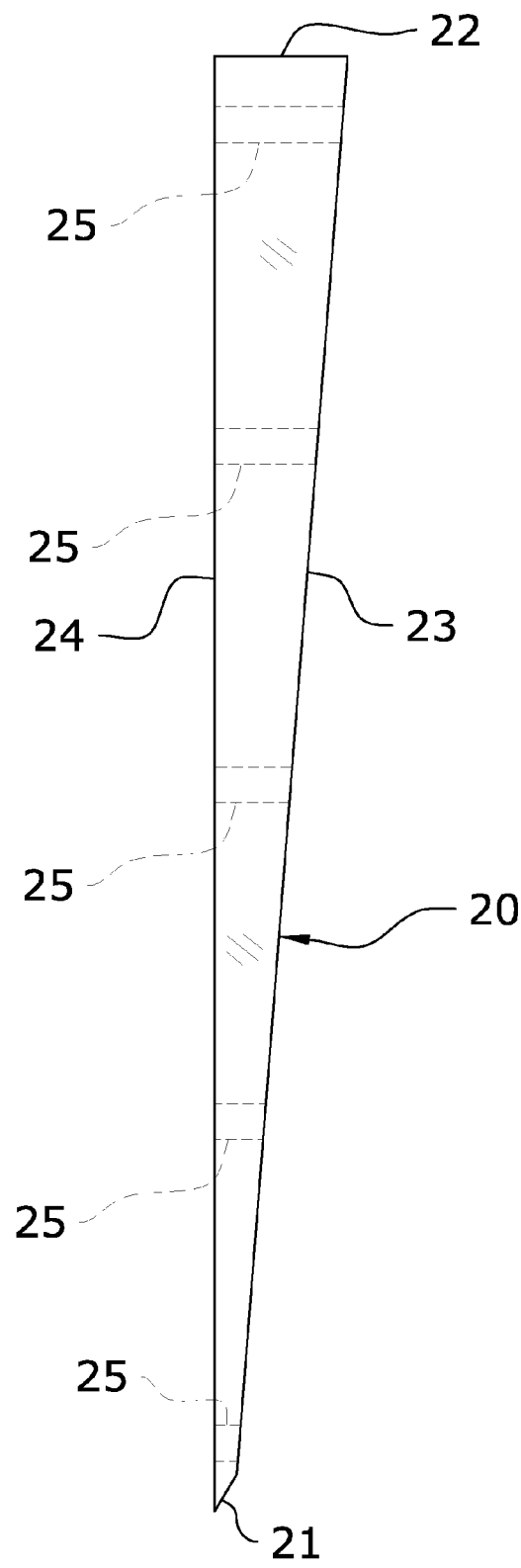
FIG. 4 is a side view of a guide member of the present invention.

A. Overview.

Turning now descriptively to the drawings, in which similar reference characters denote similar elements throughout the several views, FIGS. 1 through 6 illustrate a corn stalk guide system 10, which comprises a pair of guide members 20, 30 which may be positioned on opposing teeth 13 of a corn header assembly 12 to guide corn stalks into the assembly 12 without being expelled by exposed sprockets 15. Each guide member 20, 30 is comprised of a tapered, plastic structure having a plurality of apertures 25 extending therethrough. The first guide member 20 will be secured to a first tooth 13 via one or more fasteners 19 extending through the one or more apertures 25 and the second guide member 30 will be secured to a second tooth 13 similarly with fastener(s) 19 and aperture(s) 25. Each guide member 20, 30 will cover a sprocket 15 which normally would extend out from the tooth 13, thus guiding corn stalks and preventing loss of corn stalks.

B. Corn Header.

Figure 5:
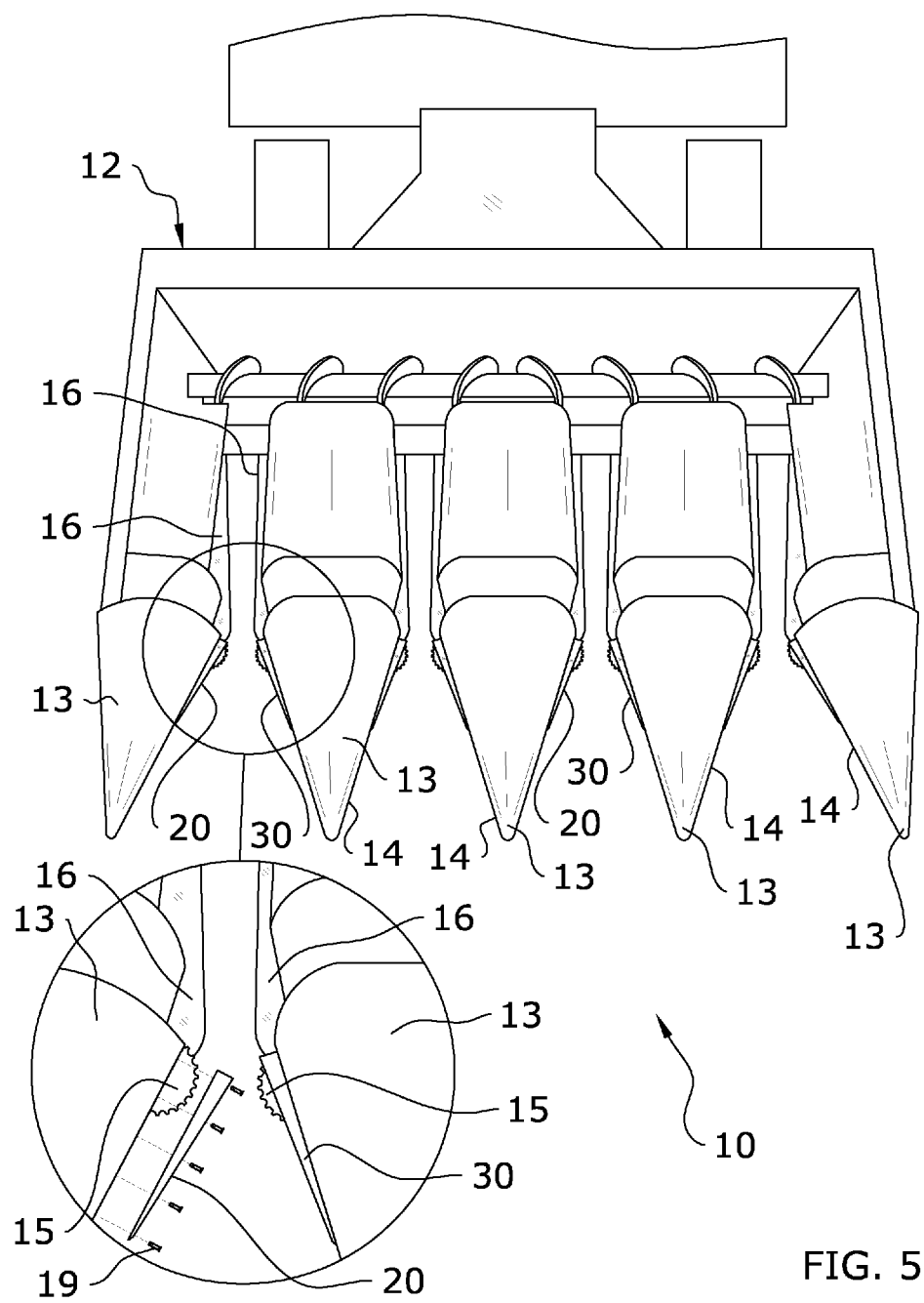
FIG. 5 is an upper perspective view of the present invention installed on a corn header.
Figure 6:
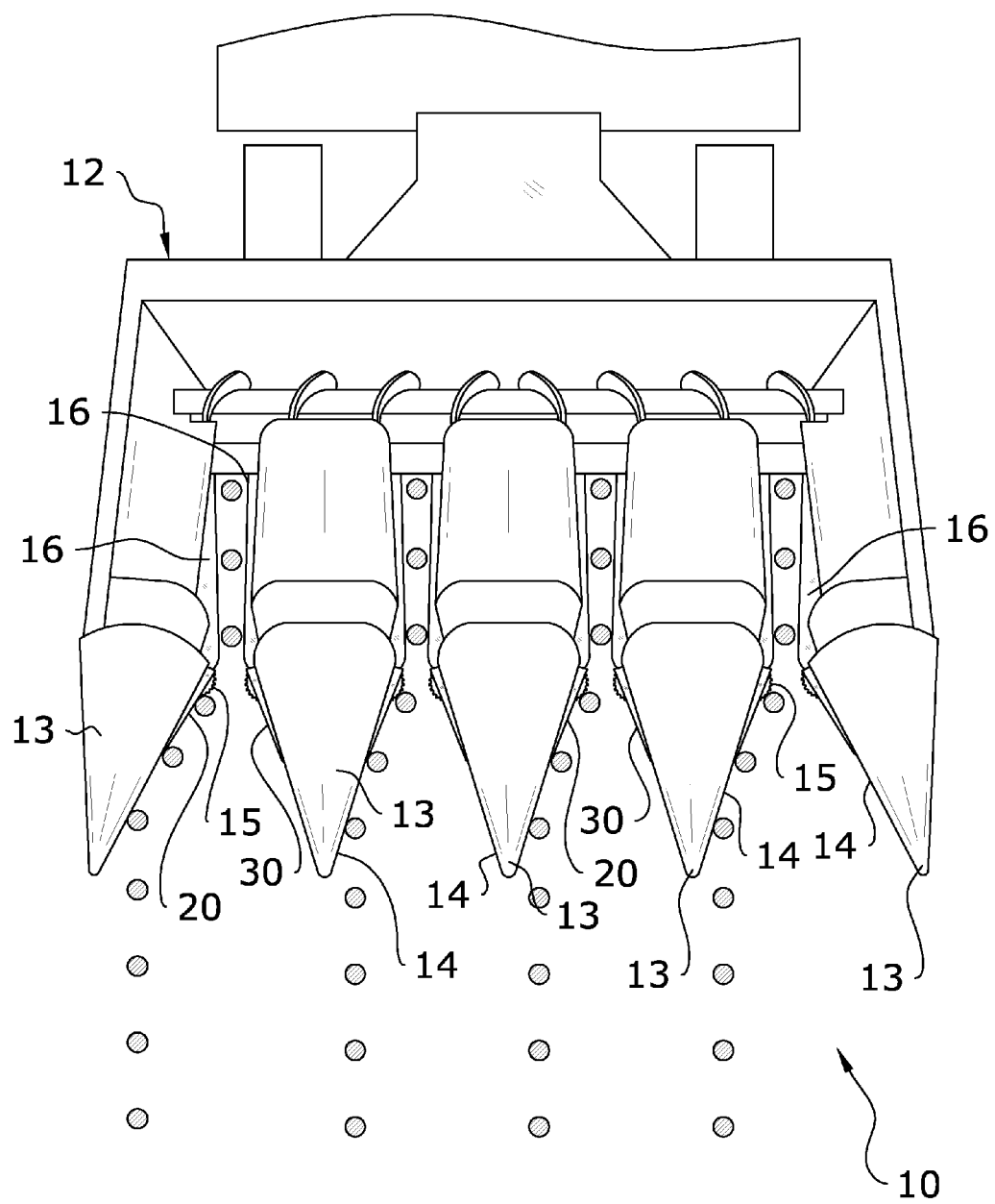
FIG. 6 is an upper perspective view illustrating the path of corn stalks as the present invention is in use.

The present invention is designed for use with various types of corn header assemblies 12. An exemplary corn header assembly 12 is shown in FIGS. 5 and 6. As seen therein, a conventional corn header assembly 12 will be comprised of an attachment for a combine or other vehicle which includes a plurality of teeth 13. The teeth 13 are designed to guide corn stalks toward a gathering member 16, generally comprised of a chain driven by a sprocket 15, which guides the corn stalks to grab rollers.

As shown in FIG. 5, existing corn header assembly 12 designs often are designed such that a portion of each sprocket 15 extends out from each tooth 13. Such a configuration has been shown to increase likelihood that a corn stalk will be expelled or improperly harvested using the corn header assembly 12. As such, the present invention was designed to prevent such issues in corn header assemblies 12 having exposed sprockets 15 extending from their teeth 13.

C. Guide Members.

The present invention utilizes guide members 20, 30 which are secured to the interior portion 14 of the teeth 13 of the corn header assembly 12 for guiding corn stalks without allowing them to be improperly expelled. A first guide member 20 is shown in FIG. 1. The first guide member 20 is comprised of a wedge-shaped member having a front end 21 and a rear end 22, wherein the first guide member 20 tapers from its rear end 22 to its front end 21.

The first guide member 20 may be comprised of various materials, but will preferably be comprised of a plastic material which is capable of repeated contact with corn stalks and weather elements without being warped or damaged. The upper surface 23 of the first guide member 20 will be diagonally oriented due to the tapering configuration of the design. The lower surface 24 of the first guide member 20 will be flat so that it may be secured to the interior portion 14 of a tooth 13 of a corn header assembly 12.

One or more apertures 25 will extend through the first guide member 20 from its upper surface 23 to its lower surface 24. Fasteners 19 will be extended through the aperture(s) 25 of the first guide member 20 to secure it to an interior portion 14 of a tooth 13 of a corn header assembly 12 as shown in FIG. 5. While the figures illustrate rows of two apertures 25 each, it is appreciated that more or less apertures 25 may be utilized so long as the first guide member 20 is securely attached to the tooth 13.

The present invention will also utilize a second guide member 30. In a corn header assembly 12, pairs of teeth 13 will be oriented next to each other to act to guide the corn stalks to be collected. Thus, a first guide member 20 will preferably be positioned on the interior portion 14 of a first tooth 13 and a second guide member 30 will preferably be positioned on the interior portion 14 of a second tooth 13 as shown in FIG. 5.

The second guide member 30 will preferably be identical to the first guide member 20. Thus, the second guide member 30 will include a front end 31 and a rear end 32, wherein the structure tapers from the rear end 32 to the front end 31. The second guide member 30 includes a diagonally-oriented upper surface 33 and a flat lower surface 34 which abuts against the interior portion 14 of a tooth 13 of the corn header assembly 20. One or more apertures 35 are also provided to secure the second guide member 30 to the tooth 13 via fasteners 19. Various configurations may be utilized for the aperture(s) 35. Further, the second guide member 30 may be comprised of various materials, but will preferably be comprised of a durable plastic material.

The guide members 20, 30 will preferably be secured to a corresponding tooth 13 such that the rear end 22, 32 of each guide member 20, 30 is flush with the rear portion of the sprocket 15. Each guide member 20, 30 should preferably cover each sprocket 15 to prevent corn stalks from being expelled during harvesting, as shown in FIG. 5.

D. Operation of Preferred Embodiment.

In use, each pair of facing teeth 13 of the corn header assembly 12 will be outfitted with a first guide member 20 and a second guide member 30, wherein the first guide member 20 is secured to a first tooth 13 and a second guide member 30 is secured to a second tooth 13 in a manner which allows the upper surfaces 23, 33 of the guide members 20, 30 to face each other. Each guide member 20, 30 should cover the corresponding sprocket 15 which abuts out from the teeth 13. Thus, as corn is entering the teeth 13, it will be guided by the guide members 20, 30 into the gathering chains 16 with a reduced or eliminated risk of being expelled due to contact with the sprocket 15 or chains 16.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A corn stalk guide system, comprising:
   a corn header assembly, wherein said corn header assembly comprises a first tooth and a second tooth;
   a first sprocket extending from said first tooth;
   a second sprocket extending from said second tooth;
   a first guide member secured to an interior surface of said first tooth via one or more fasteners, wherein said first guide member is continuously tapered from its rear end to its front end, wherein said first guide member includes one or more apertures extending from its upper surface to its lower surface, wherein said rear end of said first guide member is positioned over said first sprocket, wherein said lower surface of said first guide member extends parallel with respect to said first tooth, wherein said upper surface of said first guide member extends at an acute angle with respect to said lower surface of said first guide member and said first tooth, said rear end of said first guide member forming a right angle with respect to said lower surface of said first guide member; and
   a second guide member secured to an interior surface of said second tooth via one or more fasteners, wherein said second guide member is continuously tapered from its rear end to its front end, wherein said second guide member includes one or more apertures extending from its upper surface to tis lower surface, wherein said rear end of said second guide member is positioned over said second sprocket, wherein said lower surface of said second guide member extends parallel with respect to said first tooth, wherein said upper surface of said second guide member extends at an acute angle with respect to said lower surface of said second guide member and said first tooth, said rear end of said second guide member forming a right angle with respect to said lower surface of said second guide member.

2. The corn stalk guide system of claim 1, wherein said upper surface of said first guide member is diagonally oriented.

3. The corn stalk guide system of claim 1, wherein said lower surface of said first guide member is flat.

4. The corn stalk guide system of claim 1, wherein said first guide member is comprised of plastic.

5. The corn stalk guide system of claim 4, wherein said second guide member is comprised of plastic.

6. The corn stalk guide system of claim 1, wherein said first guide member and said second guide member are identical.

7. A corn stalk guide system, comprising:
   a corn header assembly, wherein said corn header assembly includes a first tooth and a second tooth, wherein said corn header assembly includes a first sprocket extending from said first tooth and a second sprocket extending from said second tooth;

a first guide member secured to an interior surface of said first tooth, wherein said first guide member covers said first sprocket, wherein said first guide member is continuously tapered from its rear end to its front end, wherein said first guide member includes one or more apertures extending from its upper surface to its lower surface, wherein said lower surface of said first guide member extends parallel with respect to said first tooth, wherein said upper surface of said first guide member extends at an acute angle with respect to said lower surface of said first guide member and said first tooth, said rear end of said first guide member forming a right angle with respect to said lower surface of said first guide member, wherein said first guide member comprises a triangular wedge shape; and a second guide member secured to an interior surface of said second tooth, wherein said second guide member covers said second sprocket, wherein said second guide member is continuously tapered from its rear end to its front end, wherein said second guide member includes one or more apertures extending from its upper surface to its lower surface, wherein said lower surface of said second guide member extends parallel with respect to said first tooth, wherein said upper surface of said second guide member extends at an acute angle with respect to said lower surface of said second guide member and said first tooth, said rear end of said second guide member forming a right angle with respect to said lower surface of said second guide member, wherein said second guide member comprises a triangular wedge shape.

8. The corn stalk guide system of claim 7, wherein said rear end of said first guide member is flush with a rear portion of said first sprocket and wherein said rear end of said second guide member is flush with a rear portion of said second sprocket.

* * * * *